United States Patent Office 3,470,206
Patented Sept. 30, 1969

3,470,206
PROCESS FOR PREPARING ORGANIC ETHERS
AND SULFIDE ETHERS
Donald J. Martin, Zurich, Switzerland, assignor to Stauffer
Chemical Company, New York, N.Y., a corporation of
Delaware
No Drawing. Filed June 16, 1967, Ser. No. 646,446
Int. Cl. C07d 71/00, 89/06; C07c 149/00
U.S. Cl. 260—327                                  12 Claims

ABSTRACT OF THE DISCLOSURE

Process for the preparation of organic ethers and sulfide-ethers of the formula:

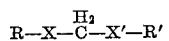

wherein R and R' are hydrocarbyl of from 1 to 12 carbon atoms which may be joined to form ring compounds and X and X' are chalcogens having molecular weights between about 11 and 37; which compounds are prepared by the preferential hydrogenation of organic thiocarbonates of the formula:

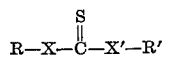

wherein R, R', X and X' are as previously defined, which comprises treating said organic thiocarbonates with hydrogen in an amount and for a time sufficient to reduce the thiocarbonyl group and hydrogenate the resultant carbon atom, at a temperature and pressure above about 80° C. and 100 p.s.i. in the presence of a hydrogenation catalyst which is resistant to sulfur poisoning; and recovering the organic product.

---

This invention relates to a process for preparing organic ethers and sulfide-ethers of the formula:

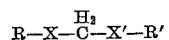

wherein R and R' are hydrocarbyl of from 1 to 12 carbon atoms which may be joined to form ring compounds and X and X' are chalcogens having molecular weights between about 11 and 37.

More particularly, this invention relates to a process for the preparation of the above compounds by the preferential hydrogenation of organic thiocarbonates. The organic thiocarbonates are represented by the formula:

$$R-X-\overset{\overset{S}{\|}}{C}-X'-R'$$

wherein R and R', X and X' are as previously defined.

By the process of this invention, organic ethers and sulfide-ethers of the formula:

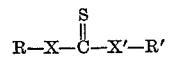

wherein R, R', X and X' are as previously defined, are prepared by hydrogenating an organic thiocarbonate to reduce the thiocarbonyl group

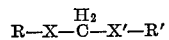

The mechanism is believed to be that depicted by the following reaction diagrams:

(1) 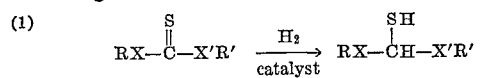

(2) 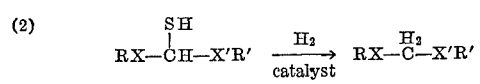

wherein R, R', X and X' are as previously defined. The organic thiocarbonate compound is first charged into a hydrogenation autoclave with a hydrogenation catalyst resistant to sulfur poisoning. An inert solvent is preferably employed. The autoclave is then filled with hydrogen at superatmospheric pressure and is agitated and heated to a temperature sufficient for reduction and hydrogenation to occur. In order to achieve reaction at a suitable rate, a temperature is employed above about 80° C., and preferably above about 150° C. Superatmospheric pressures are generally employed above about 100 p.s.i., and preferably above about 500 p.s.i. The pressure will, of course, depend upon the temperature employed. When the reaction is complete as evidenced by no further hydrogen absorption, the autoclave is cooled and the reaction mixture filtered and distilled at reduced pressure to recover the organic product. The product may then be purified by the conventional methods of distillation, crystallization, or solvent extraction, etc.

The organic ethers and thioethers of the invention are useful in organic synthesis by reason of their stability and extreme reactivity. Examples of reactions; and compounds which can be prepared are illustrated in C. and E.N., Jan. 3, 1966, page 35. These compounds may also be employed as lube oil additives, ore floation agents, vulcanizing agents, plasticizers and as pesticides for the destruction of houseflies and other common household and agricultural pests.

Representative examples of organic ethers and sulfide-ethers which can be produced by the process of this invention include the following:

(A) Aliphatic dithioethers such as 2,4-dithiapentane, 3,5-dithiaoctane, 4,6-dithiadecane, and 5,7-dithiadodecane;

(B) Aliphatic polyethers such as 2,4-dioxapentane, 3,5-dioxahepane, 3,5-dioxanone, and 5,7 dioxadodecane;

(C) Aliphatic sulfide-ethers such as 2-oxa-4-thiapentane, 3-oxa-5-thiooctane, 3-oxa-5-thianonane, and 5-oxa-7-thiadodecane;

(D) Alicyclic dithioethers such as:

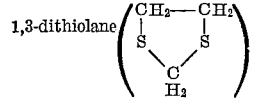

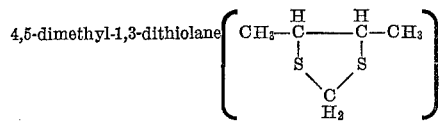

(E) Alicyclic ethers and sulfide-ethers such as:

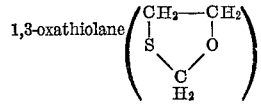

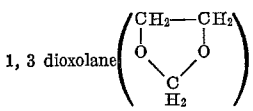

(F) Aromatic dithioethers such as diphenyl dithiamethane;

(G) Aralkyl dithioethers such as dixyzyl dithiamethane;

(H) Alkaryl dithioethers such as bis(ethylphenyl) dithiamethane, bis(propylphenyl)thiamethane;

(I) The corresponding sulfide ethers and polyethers of the compounds of (F), (G) and (H); and (J) Compounds of the type represented by (A), (B), (C), (F), (G), (H) and (I) wherein the substituents represented by R and R' are different, for example compounds such as 1-thiaphenyl-3-thiaethylmethane, 1-thiaoctyl-3-oxaxylylmethane, etc.

Generally higher yields are obtained when organic trithiocarbonates are employed as the thiocarbonate reactant because of the well known thermal stability of these compounds. Accordingly, the process of the invention is particularly useful for the preparation of dithioethers.

The thiocarbonate starting materials are well known compounds. For methods of preparation, see Reid, Organic Chemistry of Bivalent Sulfur, volume IV, chapter 2, Thiocarbonic Acids and Derivatives, Chemical Publishing Co., Inc. (1962); and Culvenor, C.C.G., Davies W., and Pausacher, K.H., J. Chem. Soc. 10.50, 1946.

Hydrogenation catalysts which can be employed for the process of this invention are the sulfides of heavy metals such as molybdenum, tungsten, nickel, cobalt and rhenium and mixtures thereof. Other less preferred hydrogen agents may be employed, however, such as the oxides of heavy metals to include copper-chromium, ruthenium and palladium, etc., and mixtures. The total amount of catalyst will depend on the particular catalyst employed but will generally be between about 0.1% and 20% and preferably between about 1% and about 10% based on the weight of the thiocarbonate reactant.

Solvents are generally used but not required. Examples of hydrogenation solvents include the commonly employed inert solvents such as methanol, ethanol, acetic acid, dioxane, cyclohexane, methylcyclohexane, tetrahydrofuran, ethyl acetate, dimethyl formylamide, benzene, and water.

The following examples will serve to illustrate the invention and several of its modifications.

Example 1

50 grams (0.37 mole) of ethylene trithiocarbonate dissolved in 200 milliliters of benzene, and 5.0 grams of molybdenum trisulfide are placed in an autoclave. The autoclave is pressurized to 2,000 p.s.i. with hydrogen; heated to 150° C., and held at this temperature for 12 hours with agitation while maintaining a constant hydrogen pressure. The reaction is then terminated; the reaction mixture filtered to remove the catalyst and the product recovered by evaporating the solvent at reduced pressure. 37.0 grams of 1,3-dithiolane of 93% purity is recovered, having a boiling point of 175° C. and an index of refraction of $N_D^{25}=1.5975$. The product is further identified by infrared spectroscopy, nuclear magnetic resonance spectroscopy, and ultra-violet spectroscopy, and gas layer chromatography.

Example 2

To a 750 cc. bomb is placed 50 grams (0.36 mole) of dimethyl trithiocarbonate, 100 milliliters of benzene, 5 grams of molybdenum monosulfide, and 5 grams of cobalt monosulfide. The bomb is closed; charged to 3,000 p.s.i. with hydrogen; heated to 150° C. and maintained at this temperature with agitation and constant pressure for 16 hours. The bomb is then vented and the reaction mixture filtered and distilled at reduced pressure to recover 20.5 grams of product. The product is identified by nuclear magnetic resonance, ultra-violet and infra red spectroscopy as 2,4-dithiapentane having an index of refraction of $N_D^{25}=1.5331$ and a boiling point of 85–96° C.

Example 3

To a 750 cc. bomb is placed 50 grams of didodecyl trithiocarbonate, 100 milliliters of carbon tetrachloride, 2.5 grams of molybdenum disulfide, and 2.5 grams of molybdenum trisulfide. The bomb is closed; charged to 2,500 p.s.i. with hydrogen; heated to 175° C. and maintained at this temperature with constant agitation and pressure for 10 hours. The bomb is then vented and the reaction mixture filtered and distilled at reduced pressure to recover the product. The product is identified by nuclear magnetic resonance, ultra-violet and infra red spectroscopy as 13,15-dithiaheptacosane.

Example 4

To a 750 cc. bomb is placed 50 grams of dibutyl trithiocarbonate, 100 milliliters of benzene, 2.5 grams of molybdenum disulfide, and 2.5 grams of molybdenum trisulfide. The bomb is closed; charged to 2,700 p.s.i. with hydrogen; heated to 165° C. and maintained at this temperature with agitation and constant pressure for 9 hours. The bomb is then vented and the reaction mixture filtered and distilled at reduced pressure to recover the product. The product is identified by nuclear magnetic resonance, ultra-violet and infra red spectroscopy as 5,7-dithiaundecane.

Example 5

To a 750 cc. bomb is placed 50 grams of ethylene dithiocarbonate, 200 milliliters of benzene, and 3 grams of molybdenum trisulfide. The bomb is closed; charged to 3,000 p.s.i. with hydrogen; heated to 165° C. and maintained at this temperature with agitation and constant pressure for 18 hours. The bomb is then vented and the reaction mixture filtered and distilled at reduced pressure to recover the product. The product is identified by nuclear magnetic resonance, ultra-violet and infra red spectroscopy as 1,3-oxathiolane.

Example 6

To a 750 cc. bomb is placed 50 grams of methyl ethyl trithiocarbonate, 100 milliliters of methanol, and 10 grams of tungsten trisulfide. The bomb is closed; charged to 2,000 p.s.i. with hydrogen; heated to 150° C. and held at this temperature with agitation and constant pressure for 12 hours. The bomb is then vented and the reaction mixture filtered and distilled at reduced pressure to recover the product. The product is identified by nuclear magnetic resonance, ultra-violet and infrared spectroscopy as 2,4-dithiahexane.

What is claimed is:
1. A process for preparing organic ethers and sulfide-ethers of the formula:

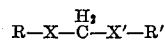

wherein R and R' are hydrocarbyl of from 1 to 12 carbon atoms which may be joined to form ring compounds and X and X' are chalcogens having molecular weights between about 11 and 37, which compounds are prepared by the preferential hydrogenation of organic thiocarbonates of the formula:

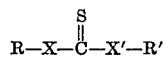

wherein R, R', X and X' are as previously defined, which comprises treating said organic thiocarbonates with hydrogen in an amount and for a time sufficient to reduce the thiocarbonyl group and hydrogenate the resultant carbon atom, at a temperature and pressure above about 80° C. and 100 p.s.i. in the presence of a hydrogenation catalyst and recovering the organic product.

2. The process of claim 1 wherein the hydrogenation catalyst is a sulfide of molybdenum or cobalt and mixtures thereof.

3. The process of claim 1 wherein the temperature and pressure are maintained above about 150° C. and 500 p.s.i.

4. The process of claim 1 wherein X and X' are sulfur.

5. The process of claim 1 wherein X is sulfur and X' is oxygen.

6. The process of claim 1 wherein the thiocarbonate is ethylene trithiocarbonate.

7. The process of claim 1 wherein the thiocarbonate is dimethyl trithiocarbonate.

8. The process of claim 1 wherein the thiocarbonate is didodecyl trithiocarbonate.

9. The process of claim 1 wherein the thiocarbonate is dibutyl trithiocarbonate.

10. The process of claim 1 wherein the thiocarbonate is ethylene dithiocarbonate.

11. The process of claim 1 wherein the thiocarbonate is methyl ethyl trithiocarbonate.

12. The process of claim 1 wherein the organic thiocarbonate is an organic trithiocarbonate, the temperature and pressure is maintained above about 150° C. and 500 p.s.i., and the hydrogenation catalyst is a sulfide of molybdenum or cobalt or mixtures thereof.

References Cited

UNITED STATES PATENTS 3,357,995  12/1967  Klein _____ 260—327

JAMES A. PATTEN, Primary Examiner

U.S. Cl. X.R.

252—60; 260—340.9, 609, 611, 613, 615, 999

PO-1050
(5/69)

UNITED STATES PATENT OFFICE
CERTIFICATE OF CORRECTION

Patent No. 3,470,206  Dated September 30, 1969

Inventor(s) Donald J. Martin

It is certified that error appears in the above-identified patent and that said Letters Patent are hereby corrected as shown below:

In the Claims, line 59, after the word "catalyst" please insert -- selected from the sulfides of molybdenum tungsten, nickel, cobalt and rhenium.

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents